United States Patent
Welshimer et al.

(10) Patent No.: US 10,561,118 B1
(45) Date of Patent: Feb. 18, 2020

(54) METHOD OF FORMING A NON-DISPERSIBLE GRANULAR SUBSTRATE AND THE GRANULAR SUBSTRATES FORMED THEREBY

(71) Applicant: The National Lime and Stone Company, Findlay, OH (US)

(72) Inventors: James Welshimer, Findlay, OH (US); Jeffrey Wigdahl, Findlay, OH (US); Jonathan Smeltz, Findlay, OH (US)

(73) Assignee: The National Lime and Stone Company, Findlay, OH (US)

( * ) Notice: Subject to any disclaimer, the term of this patent is extended or adjusted under 35 U.S.C. 154(b) by 122 days.

(21) Appl. No.: 15/950,230

(22) Filed: Apr. 11, 2018

Related U.S. Application Data

(60) Provisional application No. 62/639,125, filed on Mar. 6, 2018.

(51) Int. Cl.
 *A01K 1/015* (2006.01)
(52) U.S. Cl.
 CPC .................................. *A01K 1/0155* (2013.01)
(58) Field of Classification Search
 CPC ... A01K 1/0155; A01K 1/0152; A01K 1/0154
 USPC ......................... 119/171, 172, 173
 See application file for complete search history.

(56) References Cited

U.S. PATENT DOCUMENTS

| 4,424,763 A * | 1/1984 | Johnson ............... A01K 1/0155 |
| | | 119/171 |
| 6,231,660 B1 | 5/2001 | Welshimer et al. |
| 6,613,138 B2 | 9/2003 | Welshimer et al. |
| 8,404,259 B2 | 5/2013 | Welshimer et al. |

OTHER PUBLICATIONS

J.A. Halt, Review of Organic Binders for Iron Ore Agglomeration, Department of Chemical Engineering, Michigan Technological University, Houghton, MI, 2013.

* cited by examiner

*Primary Examiner* — Yvonne R Abbott-Lewis
(74) *Attorney, Agent, or Firm* — Marshall & Melhorn, LLC

(57) ABSTRACT

A non-dispersible granular substrate remains solid when exposed to moisture is formed of a plurality of granules, each granule being a mixture including an inert mineral component, a binder formed of a reaction between cane molasses and hydrated lime, and optionally a light weight additive. A method of making a non-granular substrate includes forming a batch mixture including an inert mineral component, hydrated lime, cane molasses, water and optionally a light weight additive, and co-pelletizing the batch mixture to form a plurality of granules. The granular substrate can be used, for example, as animal bedding (e.g. cat litter).

13 Claims, No Drawings

METHOD OF FORMING A NON-DISPERSIBLE GRANULAR SUBSTRATE AND THE GRANULAR SUBSTRATES FORMED THEREBY

BACKGROUND OF THE INVENTION

The invention relates to granular materials used as animal bedding (e.g. cat or other animal litter). Such granular materials are typically 1 to 1.5 millimeters in average particle size (approx. US mesh 8×16), with a bulk density less than 65 pounds per cubic foot (pcf) and with an RTA (weight % resistance to attrition) of at least 85%.

Animal litter granules are usually blended with a "clumping agent" to assure that the litter (when moistened) will form a firm and solid clump which can be easily removed from the litter box. Animal litter granules which soften when exposed to moisture can form clumps in the litter box which are too soft to be easily removed. The granules of the present invention remain solid when exposed to moisture enhancing the performance of the litter product.

SUMMARY OF THE INVENTION

A non-dispersible (in water) granular substrate which remains solid when exposed to moisture is formed of a plurality of granules, each granule being a mixture including an inert mineral component, a binder (formed of a reaction between cane molasses and hydrated lime), and optionally a light weight additive. The granular substrate could be used, for example, as animal bedding (e.g. cat litter). A method of making a non-dispersible and non-softening (when exposed to moisture) granular substrate includes forming a batch mixture including an inert mineral component, hydrated lime, cane molasses, water and optionally a light weight additive, and co-pelletizing the batch mixture to form a plurality of granules. In embodiments, the method may include drying the granules to a moisture content of 4% to 10% (preferably 6% to 8%), and storing the granules at a temperature of 50° F. to 140° F. (in a manner which retains the 4% to 10%, preferably 6% to 8%, moisture content) to enable complete reaction of the cane molasses and hydrated lime.

DESCRIPTION OF THE INVENTION

It is to be understood that the invention may assume various alternative orientations and step sequences, except where expressly specified to the contrary. It is also to be understood that the specific materials and processes described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

The invention uses a binder comprised of a product of the reaction between cane molasses and hydrated lime to generate granules which are both non-dispersible in water and that remain solid when exposed to moisture.

Water dispersibility was tested by placing about 10 grams of the granular substrate into 100 ml of water at room temperature in a ~250 ml closed clear glass container. After one minute, the container was inverted and the time was observed until the granular material completely dispersed. The granules of the present invention showed no disintegration after 5 minutes following inversion. They are essentially non-dispersible in water.

The property of remaining solid when moistened was tested by fingering granules which had remained submersed in water for 8 minutes and for 16 minutes. If 80% or more of the moistened granules were determined to be solid after 8 minutes and 75% or more were determined to be solid after 16 minutes, then the granules were judged to be sufficiently solid following moistening.

The granules of the invention preferably are light weight, show high liquid absorption capacity, show excellent long term storage stability, and show sufficient strength (resistance to attrition) to endure additional commercial processing and material handling.

It is to be understood that the specific compositions and processes described herein are simply exemplary embodiments of the inventive concepts. Hence, specific compositions and physical characteristics relating to the embodiments disclosed herein should not be considered as limiting, unless the claims expressly state otherwise. Unless stated otherwise, all percentages expressed herein are by weight.

In accordance with the invention, a granular material or granular substrate includes one or more inert mineral components, a binder comprised of a product of a reaction between cane molasses and hydrated lime, water, and (optionally) one or more light weight additives, which may be included to reduce bulk density of the resulting granules. These components are agglomerated using a pin mixer and pan or other conventional agglomeration equipment and processes.

The granules may then be heated in a dryer to reduce their moisture content to a range of values between about 4% and 10%, preferably from 6% to 8%. The granules may then be screened to the desired particle size distribution and stored in bulk in silo or indoor stockpile.

Immediately after granulation and partial drying—which may for example require 15 minutes in a commercial production facility—the granules are non-dispersible in water and have sufficient resistance to attrition to endure commercial screening and material handling operations, but they will not remain solid when moistened. The portion of moisture retained in the granules following the partial drying step apparently enables additional hydration of the binder formed of a reaction between cane molasses and hydrated lime and imparts (after a few days' time in storage) the property that the granules "remain solid when moistened."

The one or more inert mineral components may be formed of any suitable inert mineral material, including dolomite, limestone, ground recycled concrete, ground air cooled blast furnace slag, granite dust or other inert mineral powders suitable for use in animal litter products. The one or more inert mineral components preferably include dolomite or limestone, with dolomite being most preferred.

The one or more inert mineral components are preferably 15% to 90% of the final granular substrate composition. The one or more inert mineral components preferably are inert mineral powders having a loose bulk density greater than about 60 pcf, preferably greater than about 70 pcf, with a particle sizing of about 100% passing 30 mesh and about 10% or more passing 200 mesh. Particle size of about 100% passing US 30 mesh, 70% to 95% passing 100 mesh, and 35% to 75% passing the 200 mesh sieve is most preferable.

The hydrated lime ingredient useful in accordance with the invention may be either calcium or dolomitic normally hydrated (commercially designated Type N) or pressure hydrated (commercially designated Type S). Type S dolomitic hydrated lime is most preferable.

The hydrated lime ingredient preferably accounts for 5% to 25% of the final granular substrate composition.

The cane molasses ingredient is preferably about 73% solids with about 43% sugars content designated "79 brix". Preferably, the amount (% weight) of solid matter contributed by the cane molasses to the composition should be about the same as the amount (% weight) of hydrated lime, but the amount (% weight) of solid matter contributed by the cane molasses to the composition may be a little as half the amount (% weight) of hydrated lime.

The dry matter from the cane molasses ingredient preferably accounts for 5% to 20% of the final granular substrate composition.

The inclusion of one or more light weight additives in the batch for forming the granular substrates of the invention is optional, depending largely on the bulk density desired of the resulting granules. Accordingly, the granules of the invention may include one or more light weight additives amounting to from 0% to 40% of the final granular substrate composition.

The one or more light weight additives are preferably dry, powder materials having a bulk density less than 35 pcf and preferably having a sizing of about 100% passing a 20 mesh sieve and about 50% or more passing a 40 mesh sieve.

Suitable light weight additives include particle board flour, expanded silica, perlite, wood flour, cellulose, ground wheat straw, and diatomaceous earth; other materials meeting the particle size and bulk density properties may also be suitable. Particle board flour is the preferred material for the light weight additive. A particle board flour material having a sizing of 95% or more passing US 40 mesh sieve is most preferred.

The bulk density of the granular material of the invention can vary to suit the desired application depending in large part on the amount of light weight additive included in the formulation. The bulk density of the granules is preferably from 25 to 40 pounds per cubic foot ("pcf"), and more preferably from 30 pcf to 35 pcf.

In certain embodiments of the invention, the granular substrates preferably exhibit an RTA of 85% or more, and most preferably 95% or more, in accordance with ASTM E 728-91 Volume 11.04, a most preferred particle size distribution of 6×60 mesh, virtually no dispersibility in water, exhibit the property of remaining solid when moistened, a liquid absorption capacity of 10% or more, a pH of 7 to 12, a moisture content of from 4% to 10%, and an angle of repose of 40° maximum, with 35° or lower being most preferred. The angle of repose of a granular material is the steepest angle of incline relative to the horizontal plane to which a material can be piled without slumping.

Other materials may be applied to the resulting granules in order to form a suitable animal bedding or litter therefrom. Such materials would typically include, as examples, a clumping agent and odor control agent. The clumping agent enables the granules of the litter composition to agglomerate into a mass upon contact with animal urine. Examples of clumping agents include sodium bentonite, xanthan gum, guar gum, etc. The clumping agent may be applied to the granules in a conventional manner.

EXAMPLES

As used herein, PBF stands for particle board flour, pcf stands for pounds per cubic foot, UOM stands for units of measure, and screen mesh sizes are all U.S. standard mesh sizes.

The recipe for trial batch 7A is as follows. The dry ingredients PBF (167.6 grams), dried dolomite stone dust (approximately 65% passing 200 mesh) (262.1 grams), and type S hydrated dolomitic lime (105.8 grams)) were thoroughly blended into a homogeneous dry mixture. Then a homogenous solution of 127.5 grams of "79 brix" cane molasses and 178.6 grams of water was prepared. The mixture of the dry ingredients and the cane molasses solution was then blended in an ~2 quart capacity stainless steel mixing bowl using a hand mixer fitted with traditional "flat blade" metal beaters to wet and thoroughly blend all the ingredients within 5 seconds. Mixing was continued for approximately 30 seconds to initiate the transformation of the mixture into discrete granules. Slight warming of the mixing bowl was noted, apparently evidence of the chemical reaction occurring between the hydrated lime and cane molasses.

Following the initial blending, the granulation continued in the same bowl for approximately 2 minutes using a hand mixer with stiff spiral wire beaters. Fine water spray (8.9 grams in total) was added from a hand held spray bottle to increase the size of the granules, which for this trial batch was about 16 mesh. These mixing procedures simulated the granulation which would occur in a commercial process pin mixer.

Following granulation with the hand mixer, the entire batch was tumbled for approximately two minutes (—50 revolutions) in a 16 inch diameter by 3.5 inch deep pelletizing pan (inclined at 45° above horizontal) to improve the roundness of the granules and provide a better estimate of granule properties if the granules would be produced in a commercial pin mixer/pelletizing pan process. Fine water spray (60.0 grams total) was added from a hand held spray bottle during this final step of the granulation process.

Following granulation the batch had a moisture content of about 33% and bulk density of 36.2 pcf. The trial batch was then dried in a laboratory oven at 230° F. over the course of about an hour to a moisture content of about 6% and stored in a sealed container maintained at room temperature for 4 days. Following the storage period, the granules smaller than 6 mesh and larger than 60 mesh were captured by sieving and were tested. The granulated batch showed the following property values: Resistance to Attrition=93.2%; Bulk Density=34.8 pcf; Moisture content=6.3%; pH=11.4; % solid after 8 minutes submersed in water=95% and % solid after 16 minutes submersed in water=80%.

In a commercial granulation process pellet fines from the process screen and oversize pellet material which has been pulverized (denoted "recycle pellet material") may also be included in the recipe. Trial batch R17.5 included pellet fines and ground pellet material ("recycle pellet material") from batches similar in composition and preparation to trial batch 7A.

The recipe for trial batch R17.5 is as follows. The dry ingredients (PBF (150.0 grams), dried dolomite stone dust (approximately 65% passing 200 mesh) (162.0 grams), recycled pellet material (120.0 grams) and type S hydrated dolomitic lime (104.4 grams)) were thoroughly blended into a homogeneous dry mixture. Then a homogenous solution of 125.8 grams of "79 brix" cane molasses and 180.2 grams of water was prepared. The mixture of the dry ingredients and the cane molasses solution were then blended in an ~2 quart capacity stainless steel mixing bowl using a hand mixer fitted with traditional "flat blade" metal beaters to wet and thoroughly blend all the ingredients within 5 seconds. Mixing was continued for approximately 30 seconds to initiate the transformation of the mixture into discrete granules.

Slight warming of the mixing bowl was noted apparently evidence of the chemical reaction occurring between the hydrated lime and cane molasses.

Following the initial blending the granulation continued in the same bowl for approximately 2 minutes using a hand mixer with stiff spiral wire beaters. Fine water spray (47.1 grams in total) was added from a hand held spray bottle to increase the size of the granules, which for this trial batch was about 16 mesh. These mixing procedures simulated the granulation which would occur in a commercial process pin mixer.

Following granulation with the hand mixer, the entire batch was tumbled for approximately two minutes (~50 revolutions) in a 16 inch diameter by 3.5 inch deep pelletizing pan (inclined at 45° above horizontal) to improve the roundness of the granules and provide a better estimate of granule properties if the granules would be produced in a commercial pin mixer/pelletizing pan process. Fine water spray (23.0 grams total) was added from a hand held spray bottle during this final step of the granulation process.

Immediately following granulation the batch had a moisture content of about 33% and bulk density of 31.9 pcf. The trial batch was then dried in a laboratory oven at 230° F. over the course of about an hour to a moisture content of about 6% and stored in a sealed container for 2 days (1 day at 140° F. followed by 1 day at room temperature). Following the storage period, the granules smaller than 8 mesh and larger than 60 mesh were captured by sieving and were tested. The granulated batch showed the following property values: Resistance to Attrition=93.6%; Bulk Density=31.3 pcf; Moisture content=6.2%; pH=11.6; % solid after 8 minutes submersed in water=90% and % solid after 16 minutes submersed in water=80%.

What is claimed is:

1. A method of making a non-dispersible granular substrate, comprising:
    forming a batch mixture comprised of an inert mineral component, cane molasses, hydrated lime, and water; and
    co-pelletizing the batch mixture to form a plurality of granules;
    wherein the resulting granules are non-dispersible in water, having a bulk density of 25 pcf or more and 40 pcf or less, and having a moisture content of from 4% to 10%.

2. The method of claim 1 wherein the resulting granules have a bulk density of 30 pcf or more and 35 pcf or less.

3. The method of claim 1 wherein the inert mineral component is comprised of dolomite or limestone or both.

4. The method of claim 1 wherein the inert mineral component is comprised of dolomite.

5. The method of claim 1 wherein the hydrated lime is comprised of Type S dolomitic hydrated lime.

6. The method of claim 1 wherein the batch mixture further comprises a light weight additive that is distinct from the inert mineral component, cane molasses, and hydrated lime of the batch mixture.

7. A method of making a non-dispersible granular substrate, comprising:
    forming a batch mixture comprised of an inert mineral component, cane molasses, hydrated lime, and water;
    co-pelletizing the batch mixture to form a plurality of granules; and
    drying the plurality of granules to a moisture content of from 4% to 10%;
    the resulting granules being non-dispersible in water and having a bulk density of 25 pcf or more and 40 pcf or less.

8. A method of making a non-dispersible granular animal bedding, comprising:
    forming a batch mixture comprised of an inert mineral component, cane molasses, hydrated lime, and water;
    co-pelletizing the batch mixture to form a plurality of granules; and
    drying the plurality of granules to a moisture content of from 4% to 10%, the resulting granules being non-dispersible in water; and
    applying a clumping agent to the plurality of granules.

9. The method of claim 8 wherein the resulting granules have a bulk density of 25 pcf or more and 40 pcf or less.

10. The method of claim 8 wherein the resulting granules have a bulk density of 30 pcf or more and 35 pcf or less.

11. A method of making a non-dispersible granular substrate, comprising:
    forming a batch mixture comprised of an inert mineral component, cane molasses, hydrated lime, and water;
    co-pelletizing the batch mixture to form a plurality of granules;
    drying the plurality of granules to a moisture content of from 4% to 10%; and
    storing the plurality of granules at a temperature of 50° F. to 140° F., retaining the 4% to 10% moisture content, to enable further reaction of the cane molasses and hydrated lime;
    the resulting granules being non-dispersible in water and remaining solid when exposed to moisture.

12. A granular substrate comprised of a plurality of granules, each granule comprising a mixture of an inert mineral component and a reaction product of cane molasses and hydrated lime, and having a moisture content of from 4% to 10%.

13. Animal bedding comprised of a plurality of granules, each granule comprising a mixture of an inert mineral component and a reaction product of cane molasses and hydrated lime, and each granule having a clumping agent applied thereto, wherein each granule has a moisture content of from 4% to 10%.

* * * * *